United States Patent
Terai et al.

(10) Patent No.: US 12,344,254 B2
(45) Date of Patent: Jul. 1, 2025

(54) CONTROL METHOD FOR VEHICLE AND CONTROL DEVICE FOR VEHICLE

(71) Applicant: NISSAN MOTOR CO., LTD., Yokohama (JP)

(72) Inventors: Yoshihiro Terai, Kanagawa (JP); Tomohiro Ito, Kanagawa (JP); Azusa Kobayashi, Kanagawa (JP); Kentaro Fuse, Kanagawa (JP); Keisuke Nishida, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/712,930

(22) PCT Filed: Nov. 26, 2021

(86) PCT No.: PCT/JP2021/043374
§ 371 (c)(1),
(2) Date: May 23, 2024

(87) PCT Pub. No.: WO2023/095281
PCT Pub. Date: Jun. 1, 2023

(65) Prior Publication Data
US 2024/0416918 A1    Dec. 19, 2024

(51) Int. Cl.
*B60W 30/188* (2012.01)
*B60W 10/08* (2006.01)

(52) U.S. Cl.
CPC .......... *B60W 30/188* (2013.01); *B60W 10/08* (2013.01); *B60W 2510/246* (2013.01);
(Continued)

(58) Field of Classification Search
None
See application file for complete search history.

(56) References Cited

U.S. PATENT DOCUMENTS 6,215,198 B1    4/2001  Inada et al.
2002/0195288 A1*  12/2002  Komiyama ........... B60W 20/13
                                                180/65.245
(Continued)

FOREIGN PATENT DOCUMENTS

JP    H10-014296 A    1/1998
JP    H11-117840 A    4/1999
(Continued)

*Primary Examiner* — Todd Melton
*Assistant Examiner* — Jason R Roberson
(74) *Attorney, Agent, or Firm* — Foley & Lardner LLP (57) ABSTRACT

This is a control method for a vehicle, the vehicle including an electric generator, an engine coupled to the electric generator, a drive motor configured to drive the vehicle, and a battery electrically connected to the electric generator and the drive motor, electric power generated by the electric generator being configured to be supplied to at least one of the battery and the drive motor. The control method is including: calculating, when a temperature of the battery is equal to or lower than a predetermined temperature, a drive torque target value based on required electric power of the vehicle and a state of the battery, controlling a torque of the electric generator based on the drive torque target value, and controlling a rotation speed of the engine based on a predetermined reference low rotation speed, thereby performing a low electric power generation control for causing the electric generator to generate electric power.

9 Claims, 5 Drawing Sheets

(52) U.S. Cl.
CPC ............... *B60W 2710/0644* (2013.01); *B60W 2710/083* (2013.01)

(56) References Cited

U.S. PATENT DOCUMENTS

| | | | |
|---|---|---|---|
| 2008/0185199 A1* | 8/2008 | Kimura | B60K 6/445 188/110 |
| 2013/0119759 A1* | 5/2013 | Kamioka | B60L 50/16 903/903 |
| 2013/0253748 A1* | 9/2013 | Kiuchi | B60W 10/02 180/65.265 |
| 2020/0122712 A1* | 4/2020 | Miki | B60W 10/06 |
| 2021/0188243 A1* | 6/2021 | Morii | B60L 1/00 |

FOREIGN PATENT DOCUMENTS

| | | |
|---|---|---|
| JP | 2003-018705 A | 1/2003 |
| JP | 2004-300957 A | 10/2004 |
| JP | 2010-173390 A | 8/2010 |
| JP | 2012-091562 A | 5/2012 |
| JP | 2015-074342 A | 4/2015 |

\* cited by examiner

CONTROL METHOD FOR VEHICLE AND CONTROL DEVICE FOR VEHICLE

TECHNICAL FIELD

The present invention relates to a control method for a vehicle and a control device for a vehicle.

BACKGROUND ART

JP 2004-300957 A discloses a technique of performing a feedback control such that an engine rotation speed is a target rotation speed during an idling operation of an engine. In this technique, an electric generator is connected to an output shaft of the engine, and the electric generator is controlled so as to absorb a torque generated by the engine when an actual engine rotation speed is higher than the target rotation speed, and the electric generator is controlled so as to apply a torque to the engine when the actual engine rotation speed is lower than the target rotation speed.

SUMMARY OF INVENTION

In the above related art, the engine rotation speed can be made to converge to a target idle rotation speed even when the engine rotation speed fluctuates due to occurrence of a load or the like during the idling operation of the engine. However, in a series hybrid vehicle in which an engine can drive an electric generator to charge a battery, an idling operation of the engine is performed, for example, when the engine or the battery is warmed up, and in this case, the battery is not charged. In addition, in a low-temperature environment, since chargeable electric power of the battery is decreased, it is difficult to charge the battery. Therefore, in a case where the idling operation of the engine is performed for a long time in such a low-temperature environment, the battery is not charged for a long time, and an SOC of the battery may continue to decrease due to electric power consumption of driving of the vehicle, auxiliary components, or the like.

An object of the present invention is to secure electric power required for driving a vehicle and operating auxiliary components, and to reduce a risk of running out of electric power of the vehicle.

One aspect of the present invention is a control method for a vehicle, the vehicle including an electric generator, an engine coupled to the electric generator, a drive motor configured to drive the vehicle, and a battery electrically connected to the electric generator and the drive motor, electric power generated by the electric generator being configured to be supplied to at least one of the battery and the drive motor. The control method is including: calculating, when a temperature of the battery is equal to or lower than a predetermined temperature, a drive torque target value based on required electric power of the vehicle and a state of the battery, controlling a torque of the electric generator based on the drive torque target value, and controlling a rotation speed of the engine based on a predetermined reference low rotation speed, thereby performing a low electric power generation control for causing the electric generator to generate electric power.

DESCRIPTION OF EMBODIMENTS

Figure 1:
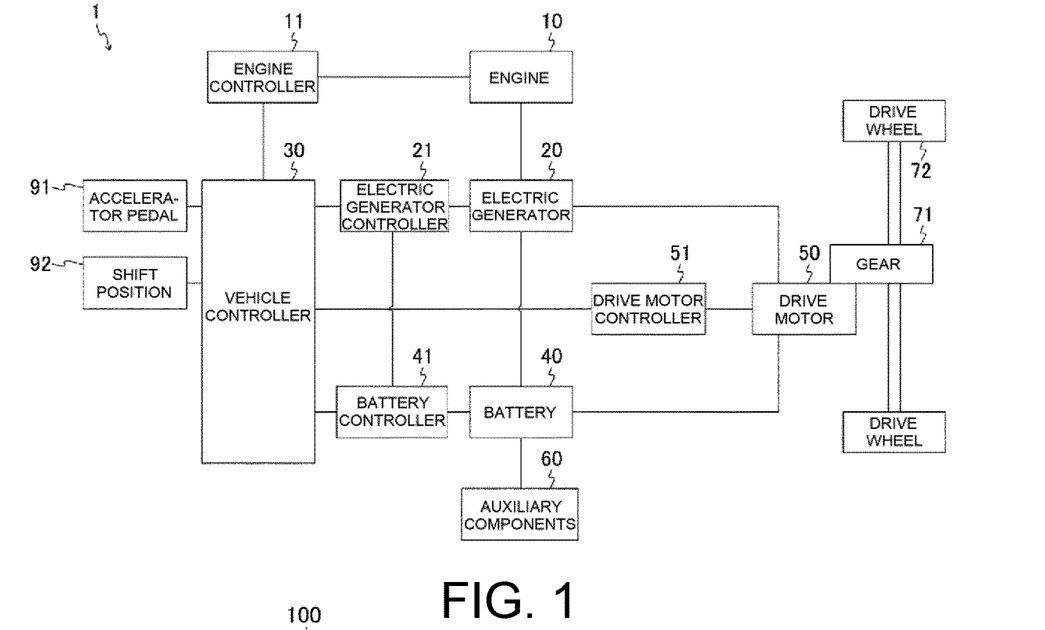
FIG. 1 is a schematic configuration diagram of a vehicle.

Hereinafter, an embodiment of the present invention will be described with reference to the accompanying drawings.
[Configuration Example of Vehicle]
FIG. 1 is a schematic configuration diagram of a vehicle 1. The vehicle 1 is a series hybrid vehicle, and in the present embodiment, an electric power generation control system for the series hybrid vehicle will be mainly described.

The vehicle 1 includes an engine 10, an electric generator 20, a battery 40, a drive motor 50, auxiliary components 60, a gear 71, and drive wheels 72. The vehicle 1 generates electric power by driving the electric generator 20 with the engine 10, and drives the drive motor 50 with the electric power generated by the electric generator 20.

The engine 10 is an internal combustion engine, for example, a gasoline engine. The engine 10 is connected to the electric generator 20 in a power transmittable manner. The electric generator 20 is a motor generator and performs motoring of the engine 10 in addition to electric power generation. The motoring is performed by driving the engine 10 in an operation stopped state by the electric generator 20. The drive motor 50 is a motor generator and generates a drive force of the vehicle 1. The drive force generated by the drive motor 50 is transmitted to the drive wheels 72 via the gear 71 which is a reduction gear. The drive motor 50 is driven by power from the drive wheels 72 to perform energy regeneration. Energy regenerated by the drive motor 50 as electric power can be charged into the battery 40.

The battery 40 stores the electric power generated by the electric generator 20 and the electric power regenerated by the drive motor 50. For example, a lithium ion secondary battery can be used as the battery 40. A discharge request state of charge (SOC) is set in the battery 40. The SOC is a parameter indicating a charge state of the battery 40, and the discharge request SOC is set in advance as a value for defining a full charge of the battery 40. In other words, the full charge of the battery 40 is defined by the discharge request SOC, and for example, a case where the SOC as a charging rate is 90% is considered to be the full charge.

In the electric power generation control system shown in the present embodiment, the drive wheels 72 and the engine 10 are independent of each other, and the engine 10 is coupled only to the electric generator 20. The engine 10 and the electric generator 20 function as an electric power generation unit and constitute an electric power generation system.

The auxiliary components 60 are devices installed in the vehicle 1, and are devices that require electric power. For example, the auxiliary components 60 are a light, a speaker, a car navigation system, an air conditioner, and the like.

The vehicle 1 further includes an engine controller 11, an electric generator controller 21, a vehicle controller 30, a battery controller 41, and a drive motor controller 51. The engine controller 11, the electric generator controller 21, the vehicle controller 30, the battery controller 41, and the drive motor controller 51 are communicably connected to each other. The vehicle controller 30 is implemented by one or a plurality of microcomputers including a central processing unit (CPU), a read-only memory (ROM), a random access memory (RAM), and an input/output interface (I/O interface). The vehicle controller 30 can also be referred to as a vehicle control module (VCM). In the vehicle controller 30, various controls are performed by the CPU executing programs stored in the ROM or the RAM. The same applies to the engine controller 11, the electric generator controller 21, the battery controller 41, and the drive motor controller 51.

The electric generator controller 21 controls the electric generator 20. The electric generator controller 21 further includes a first inverter that is an inverter for the electric generator 20. The first inverter may have a separate configuration from the electric generator controller 21. The electric generator controller 21 controls the electric generator 20 by controlling the first inverter.

The drive motor controller 51 controls the drive motor 50. The drive motor controller 51 further includes a second inverter that is an inverter for the drive motor 50. The second inverter may have a separate configuration from the drive motor controller 51. The drive motor controller 51 controls the drive motor 50 by controlling the second inverter.

The first inverter is connected to the electric generator 20 and the battery 40. The first inverter converts an alternating current supplied from the electric generator 20 into a direct current and supplies the direct current to the battery 40. Accordingly, the battery 40 is charged with the electric power generated by the electric generator 20. The first inverter further converts a direct current supplied from the battery 40 into an alternating current and supplies the alternating current to the electric generator 20. Accordingly, the electric generator 20 is driven by the electric power of the battery 40. Signals of a current, a voltage, a SOC, and the like are also input to the electric generator controller 21 from the electric generator 20, the drive motor 50, and the battery 40. The same applies to a relationship between the second inverter, the drive motor 50, and the battery 40.

The engine controller 11 controls the engine 10. For example, the engine controller 11 controls a throttle valve, a fuel injection valve, an ignition plug, and the like, and adjusts an intake amount, an injection amount, an ignition timing, and the like, so as to perform an engine control. An engine control signal can be further input to the vehicle controller 30 via the engine controller 11.

The vehicle controller 30 integrally controls the engine 10, the electric generator 20, the battery 40, the drive motor 50, and the like. The vehicle controller 30 receives signals from an accelerator opening sensor 91 for detecting an accelerator opening APO and a shift position sensor 92 for detecting a shift position (range) selected by an operation of a driver.

[Configuration Example of Control Device]

Figure 2:
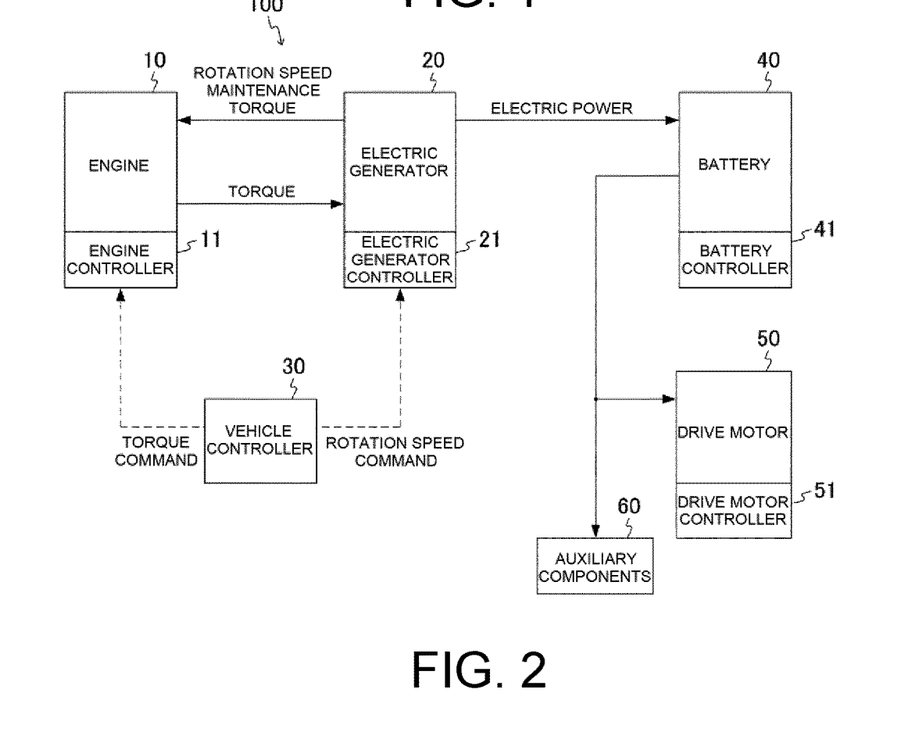
FIG. 2 is a block diagram schematically showing a configuration example of a control device for the vehicle.
Figure 3:
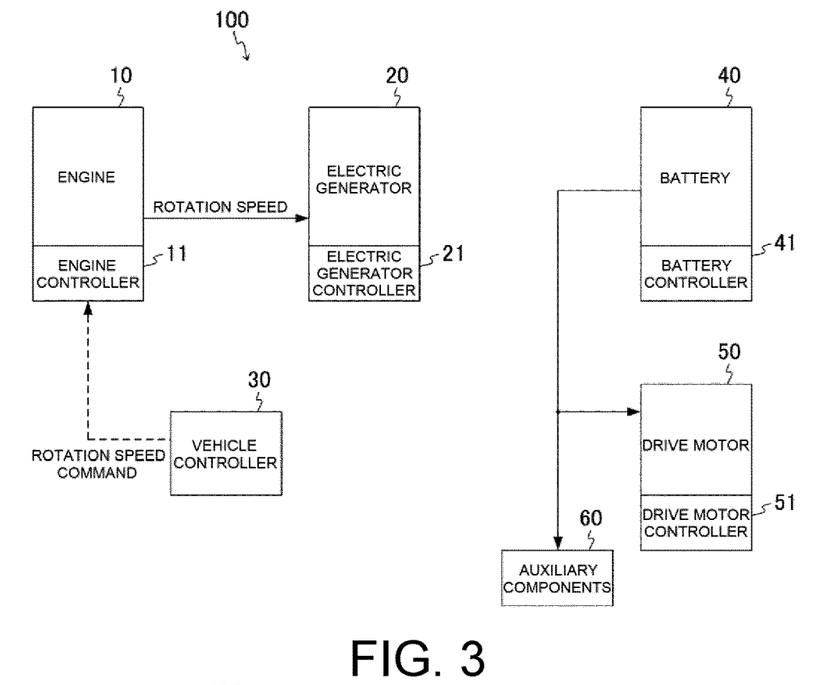
FIG. 3 is a block diagram schematically showing a configuration example of the control device for the vehicle according to a comparative example.
Figure 4:
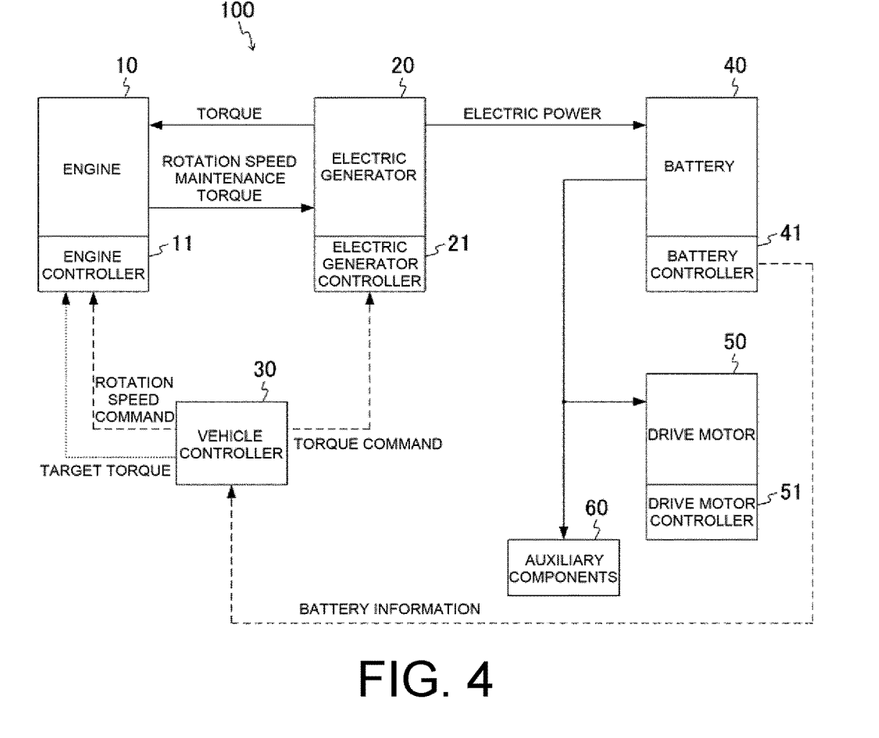
FIG. 4 is a block diagram schematically showing a configuration example of the control device for the vehicle.

FIGS. 2 and 4 are block diagrams schematically showing configuration examples of a control device 100 for the vehicle 1, respectively. FIG. 3 is a block diagram schematically showing a configuration example of the control device for the vehicle according to a comparative example. The control device 100 for the vehicle 1 is a device for performing the electric power generation control in the vehicle 1, and includes the engine 10, the electric generator 20, the battery 40, and the like. FIGS. 2 to 4 show examples of relationships when the electric power generation control and the engine control are performed in the vehicle, respectively.

FIG. 2 shows an example of a relationship in a normal electric power generation control state, FIG. 3 shows an example of a relationship in an engine-idle speed control (E-ISC) state as the comparative example, and FIG. 4 shows an example of a relationship in a low electric power generation control state.

In the vehicle 1, the electric power generated by the electric generator 20 is supplied to the battery 40, the drive motor 50, or the auxiliary components 60. A total value of the electric power generated by the electric generator 20 and the electric power of the battery 40 is supplied to the drive motor 50 and the auxiliary components 60.

[Normal Electric Power Generation Control Example]

As shown in FIG. 2, in the normal electric power generation control state, the vehicle controller 30 outputs a torque command to the engine controller 11 and outputs a rotation speed command to the electric generator controller 21. That is, in the normal electric power generation control state, the rotation speed command is output to an electric generator 20 side and the torque command is output to an engine 10 side in consideration of rotation speed controllability (response speed and accuracy). In this case, on the electric generator 20 side, a feedback control of a rotation speed based on a target rotation speed corresponding to the rotation speed command and an actual rotation speed, such as a PID control and a rotation speed servo control, is performed so as to achieve the target rotation speed. The actual rotation speed of the electric generator 20 can be detected by a rotation speed sensor, for example, a rotation phase angle sensor such as a resolver. Accordingly, the electric generator 20 controls a rotation speed of the engine 10, and the engine 10 generates a torque required for electric power generation.

As shown in FIG. 2, in the normal electric power generation control state, the electric generator 20 generates a rotation speed maintenance torque to maintain the rotation speed of the engine 10. The rotation speed maintenance torque can also be considered as a negative torque, a friction torque, or the like based on a shaft torque of the engine 10. Specifically, the electric generator controller 21 performs a switching control of the first inverter so as to achieve the target rotation speed corresponding to the rotation speed command output from the vehicle controller 30. That is, by the switching control of the first inverter, the electric generator 20 applies the rotation speed maintenance torque to the engine 10. For example, when a rotation speed of the electric generator 20 coupled to the engine 10 is higher than the target rotation speed, the rotation speed maintenance torque is applied to decrease the rotation speed of the electric generator 20, thereby preventing the rotation of the engine 10. On the other hand, when the rotation speed of the electric generator 20 coupled to the engine 10 is lower than the target rotation speed, the rotation speed maintenance torque of the electric generator 20 is decreased.

In this way, in the normal electric power generation control state, a torque control for increasing or decreasing a torque of the engine 10 is performed to achieve the torque required for electric power generation, and a rotation speed control for increasing or decreasing the rotation speed of the electric generator 20 is performed to achieve a rotation speed based on the torque required for electric power generation of the electric generator 20. That is, the electric generator 20 generates the torque required for electric power generation and the torque required for maintaining the rotation speed, thereby generating electric power while maintaining the rotation speed of the engine 10. A value obtained by multiplying a product of the torque generated by the electric generator 20 and the rotation speed of the electric generator 20 by a coefficient is a value of the electric power generated by the electric generator 20.

The engine 10 has a property of varying with respect to a torque command value, and often generates a large torque with respect to the torque command value. In addition, it is known that the battery 40 has a property that chargeable electric power PIN is small in a low-temperature environment.

When the chargeable electric power PIN of the battery 40 is decreased at a low temperature or the like, the torque of the engine 10 is also set to be small, and if the torque of the engine 10 varies greatly in such a state, torque variation cannot be absorbed on the electric generator 20 side, and speed-up of the engine 10 occurs. In such a state, that is, in a state where the chargeable electric power PIN is small and the variation of the engine torque cannot be absorbed, it is also conceivable to set an engine-idle speed control (E-ISC) state in which the engine 10 itself performs the rotation speed control. Therefore, as the comparative example of the present embodiment, an example in which E-ISC is performed is shown in FIG. 3.

[E-ISC as Comparative Example]

As shown in FIG. 3, in the E-ISC state, the vehicle controller 30 outputs an idle rotation speed command to the engine controller 11, and a command is output to the electric generator controller 21 to stop the switching control so that the switching control is not performed. In this way, by outputting the idle rotation speed command to the engine controller 11, the engine 10 is controlled to an idle rotation speed, so that it is possible to prevent the occurrence of the speed-up. In this case, since the switching control of the first inverter of the electric generator 20 is not performed, there is no output from the battery 40 to the first inverter, and no electric power is generated from the electric generator 20.

In this way, in the E-ISC state, the engine 10 is operated at the idle rotation speed, and the electric generator 20 is in a no-load state. Therefore, the battery 40 is in a state of only discharging, and an SOC of the battery 40 continues to decrease.

In particular, when the E-ISC is performed for a long time in a low-temperature environment in which the chargeable electric power PIN of the battery 40 is decreased, the battery 40 is not charged for a long time, and the electric power may run out due to electric power consumption of the drive motor 50, the auxiliary components 60, and the like of the vehicle 1.

Therefore, in the present embodiment, in order to reduce a risk of the running out of the electric power of the vehicle 1 even when the chargeable electric power PIN is decreased such as in a low-temperature environment, low electric power generation in the electric generator 20 is performed when the engine 10 is caused to perform the rotation speed control. That is, in the present embodiment, when the chargeable electric power PIN is decreased such as in a low-temperature environment, in order to prevent the vehicle 1 from running out of the electric power, a required amount of SOC of the battery 40 is secured by performing the low electric power generation such that the required amount of SOC of the battery 40 does not fall below a lower limit value of the SOC, for example. A low electric power generation control example is shown in FIG. 4. The low electric power generation control state can also be referred to as a loaded idle speed control (ISC) state because the rotation speed of the engine 10 is controlled and the torque of the electric generator 20 is controlled to generate electric power. In the present embodiment, the normal electric power generation control (see FIG. 2) and the low electric power generation control (see FIG. 4) are switched according to a state of the battery 40 and a state of the vehicle, so that depletion of the SOC of the battery 40 is prevented while a minimum traveling performance of the vehicle 1 is secured.

[Low Electric Power Generation Control Example]

As shown in FIG. 4, in the low electric power generation control state, the vehicle controller 30 outputs a rotation speed command to the engine controller 11, and outputs a torque command corresponding to the state of the battery 40, for example, the chargeable electric power PIN, to the electric generator controller 21. That is, in the low electric power generation control state, by issuing the torque command to the electric generator 20, the generated electric power can be obtained during the rotation control by the engine 10. Accordingly, it is possible to prevent the speed-up of the rotation speed of the engine 10 and reduce the risk of the running out of the electric power of the battery 40.

The engine controller 11 performs the rotation speed control based on a rotation speed of the engine 10 detected by a rotation speed detection sensor, for example, a crank angle sensor. That is, the engine controller 11 calculates a difference between a detection value of the rotation speed detection sensor and a target value corresponding to the rotation speed command, and adjusts an air amount, fuel injection, an opening of the throttle valve, an ignition timing, and the like based on the difference value, so as to perform the rotation speed control. By performing the rotation speed control, the rotation speed maintenance torque is output from the engine 10 side. In this way, in the low electric power generation control, the torque control for increasing or decreasing the torque of the electric generator 20 is performed to achieve the torque required for electric power generation, and the rotation speed control for increasing or decreasing the rotation speed of the engine 10 is performed such that the rotation speed of the engine 10 is a predetermined reference low rotation speed.

As described above, in the low electric power generation control state, the engine 10 is controlled at a predetermined low rotation speed while generating the torque in the electric generator 20, and thus if the torque command is set to the electric generator 20 without considering a response delay of the engine 10, the engine 10 may stall.

Therefore, when the vehicle controller 30 outputs the torque command to the electric generator 20, the vehicle controller 30 preferably notifies the engine controller 11 of the same value as the torque command as a target torque. Accordingly, it is possible to correct, based on the target torque, a reference torque when the engine 10 feeds back the rotation speed when the torque is applied from the electric generator 20 to the engine 10.

In this way, when a torque corresponding to the electric power to be generated is calculated, the torque command is issued to the electric generator 20, and at the same time, the torque to be generated on the engine 10 side, that is, the target torque is output. Accordingly, it is possible to improve controllability of the rotation speed feedback.

The vehicle controller 30 acquires battery information related to the battery 40 from the battery controller 41. The battery information includes a battery warm-up determination flag, short-term chargeable electric power PIN_S, long-term chargeable electric power PIN_L, and a low temperature upper limit SOC.

Here, the battery warm-up determination flag is a flag indicating whether warm-up of the battery is completed. Specifically, the battery warm-up determination flag being on indicates that the warm-up of the battery is completed, and the battery warm-up determination flag being off indicates that the warm-up of the battery is not completed. When a cell temperature of battery 40 is equal to or higher than a temperature threshold, the battery controller 41 outputs the on as the battery warm-up determination flag to the vehicle controller 30, and when the cell temperature of the battery 40 is lower than the temperature threshold, the battery controller 41 outputs the off as the battery warm-up determination flag to the vehicle controller 30. The temperature threshold is a value that allows determining a temperature at which a performance of the battery 40 can be exhibited, and can be appropriately set based on experimental data or the like. The battery controller 41 may determine whether the cell temperature of the battery 40 is equal to or lower than the temperature threshold based on a voltage of the battery 40 or the like.

The chargeable electric power PIN is information indicating a value of electric power that can charge the battery 40. The short-term chargeable electric power PIN_S is electric power that can charge the battery 40 for a short time. The short-term chargeable electric power PIN_S corresponds to electric power generated by blowing up an engine rotation speed after the start of the engine 10, or electric power that can absorb regenerative charging electric power during traveling of the vehicle (particularly at a high speed). A time for determining the short-term chargeable electric power PIN_S is in a range of several seconds to several tens of seconds or less, and is determined by a time from the start of the engine to the blowing up of the engine rotation speed, and/or a time for the battery 40 to absorb large regenerative electric power generated at the time of deceleration of the vehicle, or the like, and is shorter than at least a range of a time for determining the long-term chargeable electric power PIN_L, which will be described later. The battery controller 41 calculates the short-term chargeable electric power PIN_S based on the SOC of the battery 40 and a temperature of the battery 40 (battery temperature).

The long-term chargeable electric power PIN_L is electric power that can charge the battery 40 for a long time. The long-term chargeable electric power PIN_L corresponds to chargeable electric power required to complete the warm-up of the battery 40 by charging. The time for determining the long-term chargeable electric power is in a range of several hundred seconds to several tens of minutes. The battery controller 41 calculates the long-term chargeable electric power PIN_L based on the SOC of the battery 40 and the temperature of the battery 40. In this way, the long-term chargeable electric power PIN_L means electric power with which the battery 40 can be continuously charged stably. The long-term chargeable electric power PIN_L functions as the chargeable electric power PIN at a low temperature based on a continuously usable long-term second value. The short-term chargeable electric power is also referred to as instantaneous chargeable electric power, and the long-term chargeable electric power is also referred to as continuous chargeable electric power.

The chargeable electric power PIN may be obtained by measuring the voltage and temperature of the battery 40. In addition, the chargeable electric power PIN may be obtained by measuring the voltage, a current, and the temperature of the battery 40. The chargeable electric power of the battery 40 may be obtained based on the short-term chargeable electric power PIN_S and the long-term chargeable electric power PIN_L. For example, at a low temperature, the chargeable electric power of the battery 40 is decreased, but it is important to secure a certain amount of charge. Therefore, for example, a value obtained by multiplying a difference value between the long-term chargeable electric power PIN_L and the short-term chargeable electric power PIN_S by a predetermined ratio can be set as the chargeable electric power of the battery 40. Accordingly, it is possible to appropriately set an amount of charge that can charge the battery 40 for a short time while using the long-term chargeable electric power as a base.

The low temperature upper limit SOC is a value indicating an upper limit SOC when the temperature of the battery 40 is low. Since an upper limit value of the SOC of the battery 40 is determined according to the battery temperature, the upper limit SOC when the battery 40 has a predetermined low temperature is also set in advance. An upper limit SOC at which the short-term chargeable electric power PIN_S can be achieved is also set in advance according to the battery temperature. Since the chargeable electric power PIN is decreased even when the SOC is increased, the low electric power generation control can be performed using the low temperature upper limit SOC such that the chargeable electric power PIN does not decrease excessively.

[Calculation Example of Torque and Rotation Speed in Low Electric Power Generation Control State]

Here, a calculation example of a rotation speed corresponding to a rotation speed command for the engine controller 11 and a torque corresponding to a torque command for the electric generator controller 21 in the low electric power generation control state will be described.

Figure 5:
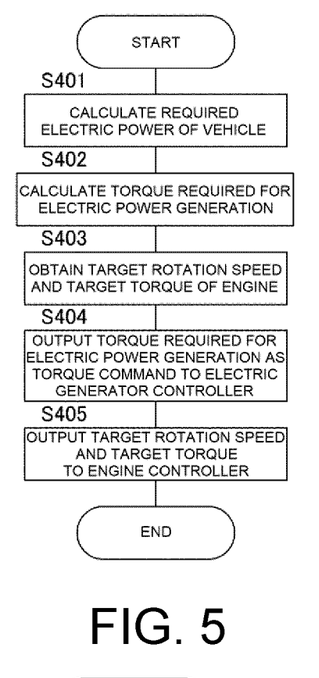
FIG. 5 is a flowchart showing an example of a control process executed by the control device for the vehicle.

FIG. 5 is a flowchart showing an example of a control process executed by the control device 100 for the vehicle 1. The control process is executed by the vehicle controller 30 based on a program stored in a storage unit (not shown). In addition, the control process is always executed in each control cycle.

In step S401, the vehicle controller 30 calculates required electric power of the vehicle 1. The required electric power is a total value of electric power required for the drive motor 50 and electric power required for the auxiliary components 60. The electric power required for the drive motor 50 is calculated based on, for example, a depression amount of an accelerator pedal and a traveling state of the vehicle 1. In addition, the electric power required for the auxiliary components 60 is calculated based on a total value of electric power required for each device constituting the auxiliary components 60.

In step S402, the vehicle controller 30 calculates a torque required for electric power generation based on the required electric power of the vehicle 1 calculated in step S401 and an SOC of the battery 40. For example, when the SOC of the battery 40 is lower than a reference value, the torque required for electric power generation for obtaining an electric power generation amount larger than a reference electric power generation amount is calculated. On the other hand, when the SOC of the battery 40 is higher than the reference value, the torque required for electric power generation for obtaining an electric power generation amount smaller than the reference electric power generation amount is calculated.

In the low electric power generation control state, the torque required for electric power generation is calculated so as to ensure electric power capable of continuously charging the battery 40 within chargeable electric power of the battery 40 calculated based on a short-term chargeable electric power PIN_S and a long-term chargeable electric power PIN_L. Accordingly, the SOC of the battery 40 can be prevented from being depleted, and the charging can be continued even when the vehicle 1 is stopped or the like with low electric power consumption. In addition, a temperature of the battery 40 can be increased, and a low chargeable electric power state due to a low temperature can be quickly escaped.

In the low electric power generation control state, the torque required for electric power generation is calculated to charge the battery 40 so as not to exceed a low temperature upper limit SOC. Accordingly, it is possible to prevent a decrease in a chargeable electric power PIN due to an increase in the SOC of the battery 40.

In step S403, the vehicle controller 30 obtains a target rotation speed and a target torque of the engine 10 based on the torque required for electric power generation calculated in step S402. A fixed value can be set as the target rotation speed in the low electric power generation control state, and this fixed value can be appropriately set based on experimental data or the like. For example, when a range of a rotation speed of the engine 10 in the normal electric power generation control state is about 1400 rpm to about 6000 rpm, the target rotation speed can be set to a value of about 1400 rpm to 2200 rpm. The target torque is the same value as the value of the torque required for electric power generation calculated in step S402.

In step S404, the vehicle controller 30 outputs the torque required for electric power generation calculated in step S402 as a torque command to the electric generator controller 21.

In step S405, the vehicle controller 30 outputs the target rotation speed and the target torque obtained in step S403 to the engine controller 11.

[Transition Example of Electric Power Generation Control State]

Here, in a low-temperature environment, it is often necessary to continue combustion for heating and protection of the engine 10. In such a low-temperature environment, when the temperature of the battery 40 is equal to or lower than a predetermined temperature, the chargeable electric power PIN of the battery 40 is often decreased. Therefore, when the temperature of the battery 40 is equal to or lower than the predetermined temperature, the low electric power generation control is performed. However, even in such a low-temperature environment, the chargeable electric power PIN of the battery 40 is increased when the warm-up of battery 40 is completed. Therefore, it is possible to determine whether the low electric power generation control is necessary based on whether the warm-up of the battery 40 is completed. The predetermined temperature is a reference value for permitting the performing of the low electric power generation control, and can be appropriately set based on experimental data or the like.

However, even in a case where the warm-up of the battery 40 is not completed, when the required electric power of the vehicle 1 is large, it is necessary to increase an electric power generation amount of the electric generator 20 according to the required electric power. Therefore, in the present embodiment, an example is described in which it is determined whether the low electric power generation control is necessary based on whether the warm-up of the battery 40 is completed and the required electric power of the vehicle 1.

[Operation Example of Control Device]

Figure 6:
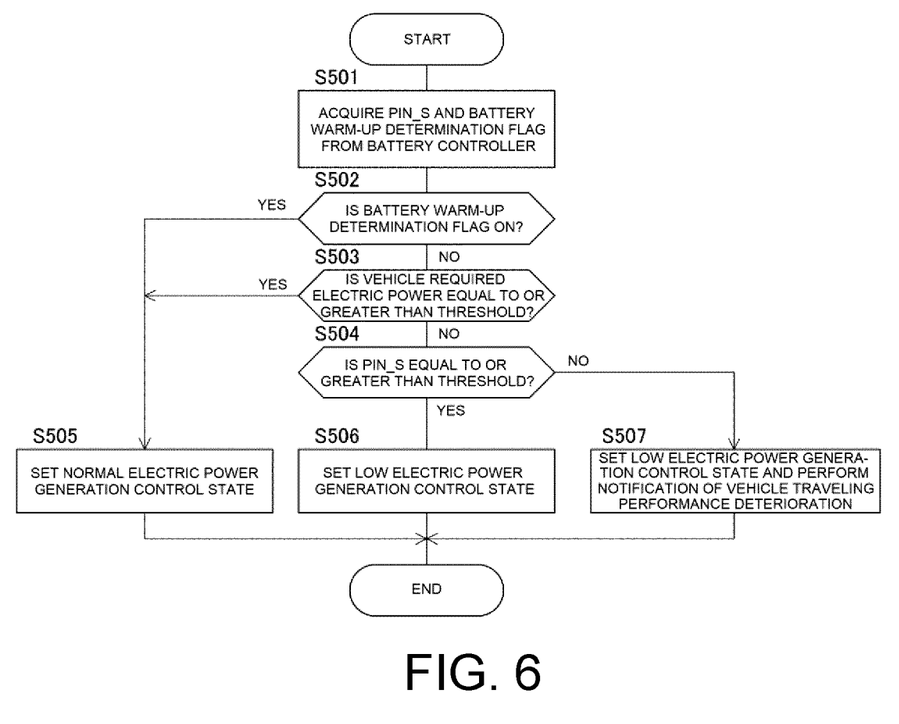
FIG. 6 is a flowchart showing an example of a control process executed by the control device for the vehicle.

FIG. 6 is a flowchart showing an example of a control process executed by the control device 100 for the vehicle 1. The control process is executed by the vehicle controller 30 based on a program stored in a storage unit (not shown). In addition, the control process is always executed in each control cycle. The control process will be described with reference to FIGS. 1 to 5 as appropriate.

In step S501, the vehicle controller 30 acquires a battery warm-up determination flag, short-term chargeable electric power PIN_S, long-term chargeable electric power PIN_L, and a low temperature upper limit SOC as battery information from the battery controller 41.

In step S502, the vehicle controller 30 determines whether the warm-up determination flag acquired in step S501 is on. When the warm-up of the battery 40 is completed, the warm-up determination flag is turned on, and when the warm-up of the battery 40 is not completed, the warm-up determination flag is turned off. That is, it is determined whether the warm-up of the battery 40 is completed. When the warm-up determination flag is on, the process proceeds to step S505. On the other hand, when the warm-up determination flag is off, the process proceeds to step S503. In this way, the vehicle controller 30 determines whether the warm-up of the battery 40 is completed based on the battery warm-up determination flag as a state of the battery 40. Then, when the warm-up of the battery 40 is not completed, the vehicle controller 30 estimates that a temperature of the battery 40 is equal to or lower than the predetermined temperature.

In step S503, the vehicle controller 30 determines whether vehicle required electric power is equal to or greater than a threshold TH1. Here, the threshold TH1 is a reference value for determining whether electric power for performing the normal electric power generation control is required, and can be appropriately set based on experimental data or the like. When the vehicle required electric power is equal to or greater than the threshold TH1, the process proceeds to step S505. On the other hand, when the vehicle required electric power is less than the threshold TH1, the process proceeds to step S504.

In this way, it is confirmed whether the warm-up of the battery 40 is completed, and when the warm-up of the battery 40 is completed, the normal electric power generation control state is set. On the other hand, transition to the low electric power generation control state is permitted only when the warm-up of the battery 40 is not completed and the temperature of the battery 40 is assumed to be low. However, even when the low electric power generation control is permitted, when required electric power of the vehicle 1 is large, for example, when the vehicle 1 travels, the normal electric power generation control state is set.

In step S504, the vehicle controller 30 determines whether the short-term chargeable electric power PIN_S acquired in step S501 is equal to or greater than a threshold TH2. Here, the threshold TH2 is a reference value for determining whether to turn on a slow lamp when the low electric power generation control is performed, and can be appropriately set based on experimental data or the like. When the short-term chargeable electric power PIN_S is equal to or greater than the threshold TH2, the process proceeds to step S506. On the other hand, when the short-term chargeable electric power PIN_S is less than the threshold TH2, the process proceeds to step S507. The slow lamp is a vehicle traveling performance deterioration notification for notifying a driver that a traveling performance of the vehicle 1 is deteriorated.

Here, regardless of whether the vehicle 1 is stopped or traveling, the traveling performance is deteriorated in the low electric power generation control state. In particular, when the short-term chargeable electric power PIN_S is less than the threshold TH2, a value of the torque command for the electric generator 20 is decreased, so that the electric power generation amount of the electric generator 20 is decreased, and the traveling performance of the vehicle 1 is likely to deteriorate. Therefore, in such a state, the slow lamp is turned on to notify an occupant of the vehicle 1 that the traveling performance is deteriorated.

In step S505, the vehicle controller 30 sets an electric power generation state performed by the engine 10 and the electric generator 20 to the normal electric power generation control state. In this case, the vehicle controller 30 performs the normal electric power generation control shown in FIG. 2.

In step S506, the vehicle controller 30 sets the electric power generation state performed by the engine 10 and the electric generator 20 to the low electric power generation control state. In this case, the vehicle controller 30 performs the low electric power generation control shown in FIG. 4.

In step S507, the vehicle controller 30 sets the electric power generation state performed by the engine 10 and the electric generator 20 to the low electric power generation control state, and turns on the slow lamp.

In this way, when the low electric power generation control is permitted, if the short-term chargeable electric power PIN_S of the battery 40 is equal to or greater than the threshold TH2, the low electric power generation control state is set without turning on the slow lamp. On the other hand, if the short-term chargeable electric power PIN_S of the battery 40 is less than the threshold TH2, the slow lamp is turned on and the low electric power generation control state is set.

In this way, in the present embodiment, in order to minimize a time period during which the state transitions to the low electric power generation control state where the obtained electric power is small, it is possible to appropriately determine whether the low electric power generation control state is necessary by using the required electric power of the vehicle 1 and the state of the battery 40. In this way, by minimizing the time period during which the low electric power generation control state is set, it is possible to reduce an occurrence frequency of a deterioration state of the traveling performance of the vehicle 1. The normal electric power generation control state is actively set in a scene in which it is difficult for the occupant of the vehicle 1 to feel the speed-up of the rotation speed of the engine 10, for example, during acceleration. In this way, in the scene in which it is difficult to feel the speed-up of the rotation speed of the engine 10, the traveling performance can be improved by actively setting the normal electric power generation control state.

Even if the warm-up of the battery 40 proceeds and the chargeable electric power PIN can be ensured to some extent from a state in which the low electric power generation control has to be performed, the state may transition to the low electric power generation control state while the vehicle 1 is stopped.

In the present embodiment, an example is shown in which in order to prevent the vehicle 1 from running out of the electric power, in the low electric power generation control, the required amount of SOC of the battery 40 is secured by performing the electric power generation such that the required amount of SOC of the battery 40 does not fall below the lower limit value of the SOC, for example. However, the present embodiment is not limited thereto. For example, the low electric power generation control may be performed such that the charging is performed to increase the SOC of the battery 40 by several percent from the required amount of SOC.

Modification 1

In the above, an example is shown in which the low electric power generation control and the normal electric power generation control are set based on the state of the battery, that is, the temperature of the battery, and the required electric power of the vehicle 1. Hereinafter, an example in which a delay process and a limiting process are executed in consideration of a response delay of the engine 10 or the like in a low electric power generation control state will be described as Modification 1.

[Control Example of Torque and Rotation Speed]

Figure 7:
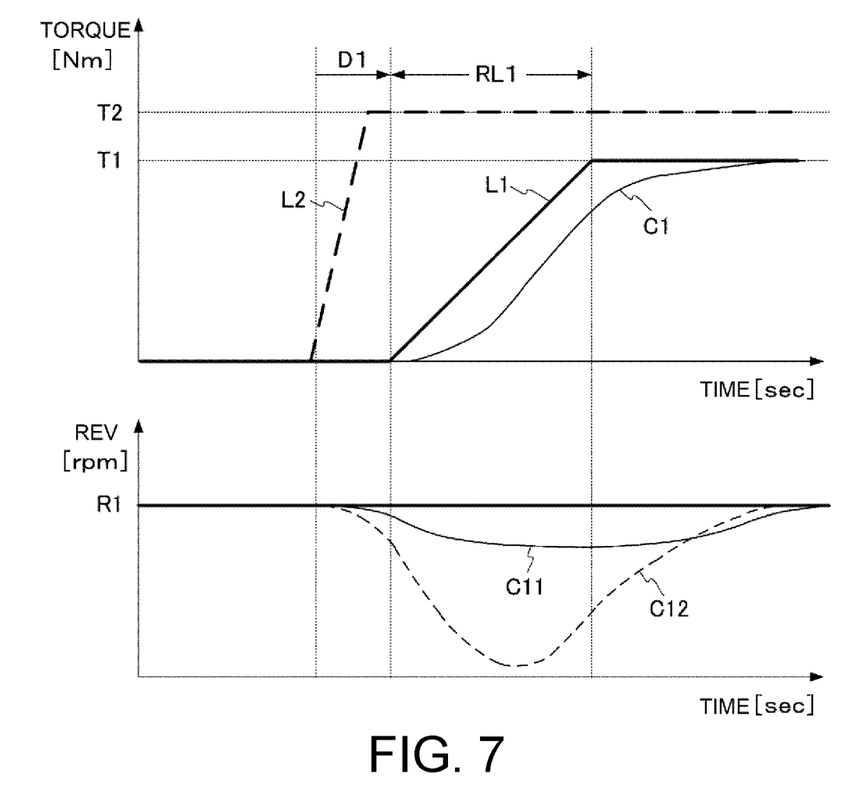
FIG. 7 is a diagram showing a setting example when setting a torque and a rotation speed in a low electric power generation control state.

FIG. 7 is a diagram showing a setting example when setting a torque and a rotation speed in the low electric power generation control state. An upper side of FIG. 7 shows a setting example of a torque of the electric generator 20, and a lower side of FIG. 7 shows a transition example of a rotation speed of the engine 10. A horizontal axis shown in the upper and lower sides of FIG. 7 indicates a time axis. A vertical axis shown on the upper side of FIG. 7 indicates a value of the torque of the electric generator 20, and a vertical axis shown on the lower side of FIG. 7 indicates a value of the rotation speed of the engine 10.

In the upper side of FIG. 7, a dotted straight line L2 indicating a target torque of the electric generator 20 as a comparative example and an upper limit value T2 of the target torque are shown. In this case, transition of an actual shaft torque of the engine 10 in response to the target torque (straight line L2) is a curve close to a curve C1. In the lower side of FIG. 7, a dotted curve C12 is shown indicating transition of the rotation speed of the engine 10 corresponding to the transition of the actual shaft torque of the engine 10 in response to the target torque as the comparative example.

In the upper side of FIG. 7, a straight line L1 indicating a target torque of the electric generator 20 set in the low electric power generation control state, an upper limit value T1 of the target torque of the electric generator 20 set in the low electric power generation control state, and the curve C1 indicating the transition of the actual shaft torque of the engine 10 in response to the target torque (straight line L1) are shown. In the lower side of FIG. 7, a curve C11 is shown indicating transition of the rotation speed of the engine 10 corresponding to the curve C1.

Here, with respect to the electric generator 20 that is electrically controlled, it is difficult for the engine 10 to respond to a torque as quickly as the electric generator 20 due to the fact that the engine 10 can only generate a torque during a combustion stroke, a response delay due to an air amount, or the like. Therefore, it is necessary to set a torque to be commanded to the electric generator 20 in consideration of responsiveness of the engine 10 and the like.

Therefore, when the commanded torque to be output to the electric generator 20 is calculated, it is important to take into account the response delay of the engine 10. If a torque command for the electric generator 20 is set while ignoring the response delay of the engine 10, a torque generated by the electric generator 20 becomes too large than a torque generated by the engine 10, significantly reducing the rotation speed, and in some cases, the engine 10 may stall.

Therefore, in Modification 1, a rate limit RL1 is set for the torque to be commanded to the electric generator 20. A delay period D1 for delaying application of the torque from a starting timing of the engine 10 and the upper limit value T1 for limiting an upper limit of the torque command are set. In this way, Modification 1 includes a rate limit function of setting the rate limit RL1 for the torque command, a delay timer function of setting the delay period D1 by delaying a timing of the torque command, and a limit function of limiting the upper limit of the torque command to the upper limit value T1. Modification 1 shows an example in which the rate limit function, the delay timer function, and the limit function are provided, but at least one of these functions may be provided.

The delay period D1 can be set based on a water temperature of the engine 10. For example, a long period can be set as the water temperature of the engine 10 is decreased. The rate limit RL1 can be set to a constant value. The rate limit RL1 is a value capable of reducing sudden fluctuations in the torque of the engine 10, and can be appropriately set based on experimental data or the like. The upper limit value T1 can be set to a value of a maximum torque that can be exhibited by the engine 10 in the low electric power generation control state.

Next, a setting example of the rate limit RL1, the delay period D1, and the upper limit value T1 will be described.

Figure 8:
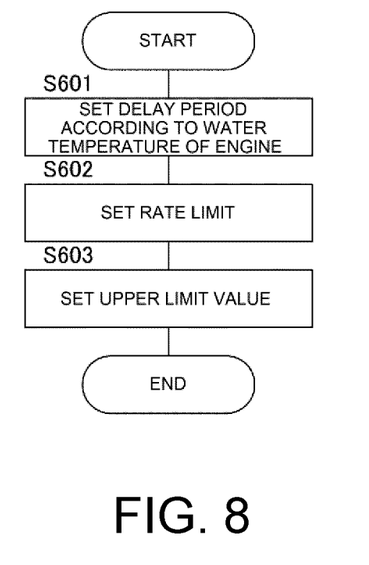
FIG. 8 is a flowchart showing an example of a control process executed by the control device for the vehicle.

FIG. 8 is a flowchart showing an example of a control process executed by the control device 100 for the vehicle 1. The control process is executed by the vehicle controller 30 based on a program stored in a storage unit (not shown). In addition, the control process is always executed in each control cycle.

In step S601, the vehicle controller 30 determines whether a water temperature of the engine 10 is equal to or lower than a water temperature threshold, and sets a delay period D1 according to the water temperature of the engine 10 when the water temperature of the engine 10 is equal to or lower than the water temperature threshold. In this way, when the water temperature of the engine 10 is equal to or lower than the water temperature threshold, the delay period D1 is set, and a torque load to the engine 10 is waited for a predetermined time. As the water temperature of the engine 10, a value acquired by a temperature sensor of the engine 10 can be acquired from the engine controller 11.

In step S602, the vehicle controller 30 determines whether to increase or decrease a torque of the electric generator 20, and sets, when increasing or decreasing the torque of the electric generator 20, a rate limit RL1 during a period in which the torque is increased or decreased.

In step S603, the vehicle controller 30 sets, as an upper limit value T1, a value of a maximum torque that can be exhibited by the engine 10 in the low electric power generation control state.

In this way, in electric power generation under the low electric power generation control state, if the electric generator 20 generates a torque at the same response speed as during a normal electric power generation control, there is a concern of an engine stall and a rotation drop. Therefore, the upper limit value T1 of the maximum torque and the rate limit RL1 that reduces a change in torque are provided. In order to stabilize combustion of the engine 10, the delay period D1 corresponding to the water temperature of the engine 10 is provided. Accordingly, the engine stall and the rotation drop can be prevented. By setting the rate limit RL1 and the upper limit value T1 at the time of issuing the torque command, rotation speed feedback of the engine 10 can be stably realized. As described above, at least one of the rate limit RL1, the delay period D1, and the upper limit value T1 may be set.

Modification 2

In Modification 2, an example will be described in which a rotation speed of the engine 10 is switched according to a state of the vehicle 1, that is, a vehicle speed, in a low electric power generation control state. Specifically, in Modification 2, an example is shown in which two types of values (LU1 and UR1 shown in FIGS. 9 and 10) are switched as a target rotation speed of the engine 10.

[Control Example of Rotation Speed Corresponding to Vehicle Speed]

Figure 9:
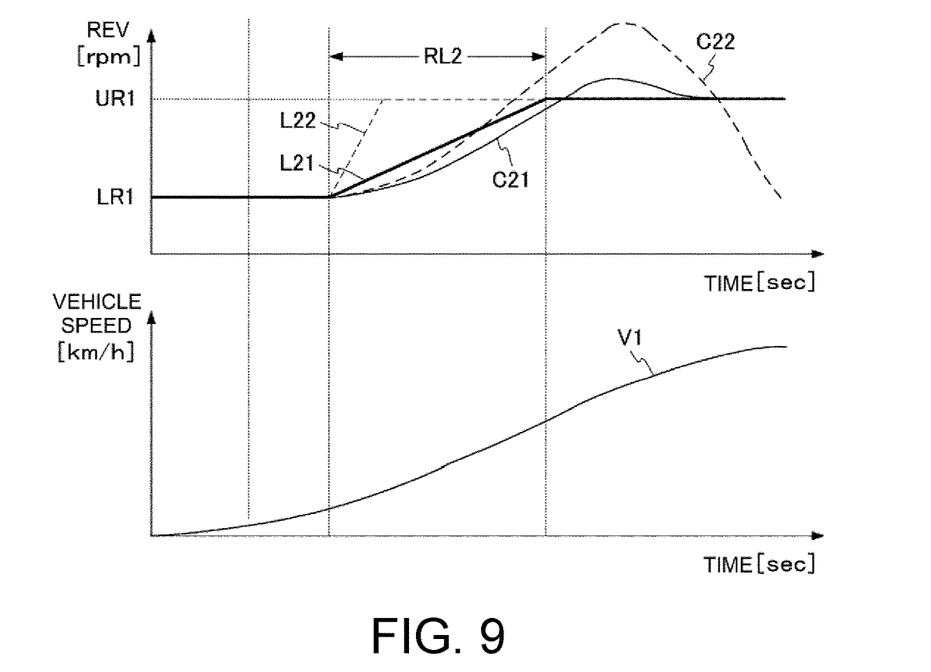
FIG. 9 is a diagram showing a switching example when a rotation speed of an engine is switched according to a vehicle speed of the vehicle in the low electric power generation control state.
Figure 10:
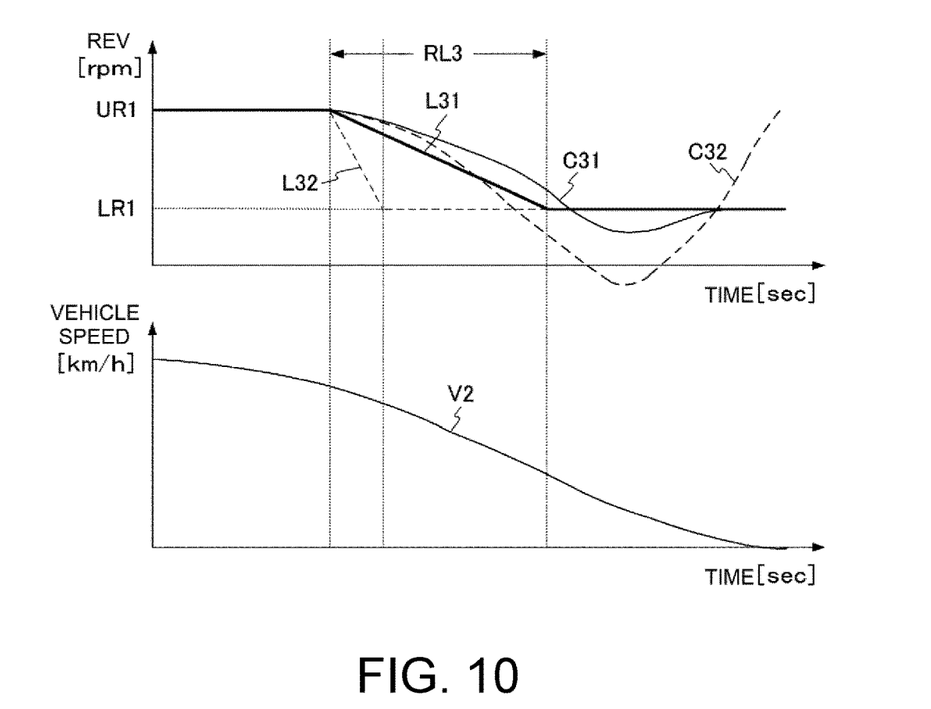
FIG. 10 is a diagram showing a switching example when the rotation speed of the engine is switched according to a vehicle speed of the vehicle in the low electric power generation control state.

Each of FIGS. 9 and 10 is a diagram showing a switching example when the rotation speed of the engine 10 is switched according to the vehicle speed of the vehicle 1 in the low electric power generation control state. FIG. 9 shows the switching example of the rotation speed of the engine 10 when a vehicle speed V1 of the vehicle 1 is increased, and FIG. 10 shows the switching example of the rotation speed of the engine 10 when a vehicle speed V2 of the vehicle 1 is decreased. A horizontal axis shown in each of FIGS. 9 and 10 indicates a time axis. A vertical axis shown on an upper side in each of FIGS. 9 and 10 indicates a value of the rotation speed of the engine 10, and a vertical axis shown on a lower side in each of FIGS. 9 and 10 indicates a value of the vehicle speed of the vehicle 1.

Each of FIGS. 9 and 10 shows an example in which two types of rotation speeds UR1 and LR1 are set according to the state of the vehicle 1, that is, the vehicle speed. The rotation speed UR1 is an example of a high rotation speed, and the rotation speed LR1 is an example of a low rotation speed. Here, it is preferable that an engine sound emitted by the engine 10 is a sound that does not give a feeling of discomfort to a user of the vehicle 1. Therefore, when the vehicle 1 is stopped or the vehicle 1 is at a low speed, that is, when the vehicle speed is lower than a threshold TH3, the rotation speed LR1 is set. On the other hand, when the vehicle 1 is at a high speed, that is, when the vehicle speed is equal to or higher than the threshold TH3, the rotation speed UR1 is set. However, when the rotation speed LR1 is set, obtained electric power is smaller than when the rotation speed UR1 is set. Therefore, it is preferable that the two types of rotation speeds UR1 and LR1 are set in consideration of a feeling of discomfort assumed to be given to the user of the vehicle 1 and electric power required for the vehicle. The threshold TH3 is a reference value at the time of switching between the two types of rotation speeds UR1 and LR1, and can be appropriately set based on experimental data or the like in consideration of the feeling of discomfort to be given to the user of the vehicle 1, the required electric power of the vehicle 1, and the like.

In Modification 2, two types of rotation speeds are switched according to the required electric power and the vehicle speed. For example, when a range of the rotation speed of the engine 10 in a normal electric power generation control state is about 1400 rpm to about 6000 rpm, values of the two types of rotation speeds UR1 and LR1 can be set to be values within a range of about 1400 rpm to 2200 rpm. For example, the value of the rotation speed LR1 can be set to be a low value in a range of 1400 rpm to 2200 rpm, and the value of the rotation speed UR1 can be set to be a high value in the range of 1400 rpm to 2200 rpm.

Straight lines L21 and L31 indicate target rotation speeds of the engine 10, and curves C21 and C31 indicate actual rotation speeds of the engine 10. Straight lines L22 and L32 indicate target rotation speeds of the engine 10 in a comparative example, and curves C22 and C32 indicate actual rotation speeds of the engine 10 in the comparative example.

In the low electric power generation control state, in a case where the switching is performed between the target rotation speed of the engine 10 and the two types of rotation speeds UR1 and LR1, if an attempt is made to rapidly change an engine rotation speed, as indicated by C22 in FIGS. 9 and C32 in FIG. 10, there is a possibility that overshoot becomes large during acceleration and undershoot becomes large during deceleration. Therefore, in order to prevent a rapid command from being issued when the rotation speed is changed, change rates RL2 and RL3 are provided in Modification 2.

Here, an increase in the vehicle speed or an increase in the required electric power of the vehicle 1 occurs when a driver of the vehicle 1 intends to travel or accelerate. In such a case, even if the rotation speed is increased and a background noise is increased, an occupant of the vehicle 1 is not given a feeling of discomfort. Therefore, the rotation speed can be switched according to the vehicle speed and the required electric power of the vehicle 1. In this way, by increasing the rotation speed of the engine 10 according to a traveling request of the driver of the vehicle 1, it is possible to increase the electric power obtained in the low electric power generation control state, and it is possible to satisfy a higher traveling performance request.

The two types of rotation speeds UR1 and LR1 may be switched based on conditions other than the vehicle speed. For example, when it is determined in step S504 (see FIG. 6) that the short-term chargeable electric power PIN_S is equal to or greater than the threshold TH2, the rotation speed UR1 can be set in step S506. On the other hand, when it is determined that the short-term chargeable electric power PIN_S is less than the threshold TH2, the rotation speed LR1 can be set in step S507. When the rotation speed LR1 is set, the slow lamp may be turned on or blinked. In Modification 2, the example in which two types of rotation speeds UR1 and LR1 are set and switched is shown, but the present embodiment is also applicable to a case where three or more rotation speeds are set and switched based on the vehicle speed or the like.

Configuration and Effects of Present Embodiment

A control method for the vehicle 1 according to the present embodiment is a control method for a vehicle in which the control device 100 for the vehicle 1 includes the electric generator 20, the engine 10 coupled to the electric generator 20, the drive motor 50 configured to drive the vehicle 1, and the battery 40 electrically connected to the electric generator 20 and the drive motor 50, and the electric power generated by the electric generator 20 is configured to be supplied to at least one of the battery 40 and the drive motor 50. In the control method, in steps S401 to S405, S501 to S504, S506, and S507, when the temperature of the battery 40 is equal to or lower than the predetermined temperature, the torque required for electric power generation (example of a drive torque target value) is calculated based on the required electric power of the vehicle 1 and the state of the battery 40, the torque of the electric generator 20 is controlled based on the torque required for electric power generation, and the rotation speed of the engine 10 is controlled based on a predetermined reference low rotation speed (for example, the rotation speeds UR1 and LR1), thereby performing the low electric power generation control for causing the electric generator 20 to generate electric power. For example, in the low electric power generation control, the torque control for increasing or decreasing the torque of the electric generator 20 is performed to achieve the torque required for electric power generation calculated based on the required electric power of the vehicle 1 and the state of the battery 40, and the rotation speed control for increasing or decreasing the rotation speed of the engine 10 is performed such that the rotation speed of the engine 10 is the predetermined reference low rotation speed.

According to this configuration, since the low electric power generation control can be performed even at a low temperature when the temperature of the battery 40 is equal to or lower than the predetermined temperature, it is possible to continuously perform the charging for ensuring the electric power required for the drive motor 50, the auxiliary components 60, and the like, and it is possible to reduce a risk of running out of electric power.

In the control method for the vehicle 1 according to the present embodiment, it is determined, based on the state of the battery 40, whether the warm-up of the battery 40 is completed, and when the warm-up of the battery 40 is not completed, it is estimated that the temperature of the battery 40 is equal to or lower than the predetermined temperature. Then, in steps S501 to S504, S506, and S507, when the warm-up of the battery 40 is not completed and the required electric power of the vehicle 1 is less than the threshold TH1 (example of a first threshold), the low electric power generation control is performed.

According to this configuration, when the warm-up of the battery 40 is not completed and the required electric power of the vehicle 1 is less than the threshold TH1, the low electric power generation control is performed, and thus the battery 40 can be appropriately charged even at a low temperature.

In the control method for the vehicle 1 according to the present embodiment, in steps S401 to S405, S501 to S503, and S505, when the warm-up of the battery 40 is completed or when the required electric power of the vehicle 1 is equal to or greater than the threshold TH1 (example of the first threshold), the torque required for electric power generation (example of the drive torque target value) is calculated based on the required electric power of the vehicle 1 and the state of the battery 40, the torque of the engine 10 is controlled based on the torque required for electric power generation, and the rotation speed of the electric generator 20 is controlled based on the rotation speed based on the torque required for electric power generation of the electric generator 20, thereby performing the normal electric power generation control for causing the electric generator 20 to generate electric power. For example, in the normal electric power generation control, the torque control for increasing or decreasing the torque of the engine 10 is performed to achieve the torque required for electric power generation calculated based on the required electric power of the vehicle 1 and the state of the battery 40, and the rotation speed control for increasing or decreasing the rotation speed of the electric generator 20 is performed to achieve the rotation speed based on the torque required for electric power generation of the electric generator 20.

According to this configuration, when a performance of the battery 40 is not deteriorated or when the required electric power of the vehicle 1 is relatively large, the normal electric power generation control can be performed, and thus it is possible to secure the electric power required for the drive motor 50, the auxiliary components 60, and the like.

In the control method for the vehicle 1 according to the present embodiment, in steps S506 and S507, in the low electric power generation control, the torque control of the electric generator 20 and the rotation speed control of the engine 10 are performed based on the electric power generated by the electric generator 20 and the chargeable electric power PIN of the battery 40 corresponding to the temperature of the battery 40. For example, in the low electric power generation control, the torque control of the electric generator 20 and the rotation speed control of the engine 10 are performed such that the electric power generated by the electric generator 20 falls within a range of the chargeable electric power PIN of the battery 40 corresponding to the temperature of the battery 40.

According to this configuration, since the low electric power generation control is performed such that the electric power generated by the electric generator 20 is within the range of the chargeable electric power PIN of the battery 40, it is possible to realize an appropriate electric power generation control corresponding to the chargeable electric power PIN of the battery 40. Accordingly, the SOC of the battery 40 can be prevented from being depleted, and the charging can be continued even when the vehicle 1 is stopped or the like with low electric power consumption. In addition, the temperature of the battery 40 can be increased, and the low chargeable electric power state due to the low temperature can be quickly escaped.

In the control method for the vehicle 1 according to the present embodiment, in steps S506 and S507, in the low electric power generation control, the torque control of the electric generator 20 and the rotation speed control of the engine 10 are performed based on the electric power generated by the electric generator 20 and the upper limit SOC of the battery 40 determined according to the battery temperature. For example, in the low electric power generation control, the torque control of the electric generator 20 and the rotation speed control of the engine 10 are performed such that the electric power generated by the electric generator 20 does not exceed the upper limit SOC of the battery 40 determined according to the battery temperature.

According to this configuration, since the low electric power generation control is performed such that the electric power generated by the electric generator 20 does not exceed the upper limit SOC of the battery 40, it is possible to realize the appropriate electric power generation control corresponding to the upper limit SOC of the battery 40. In addition, it is possible to prevent a decrease in the chargeable electric power PIN due to an increase in the SOC of the battery 40.

In the control method for the vehicle 1 according to the present embodiment, in steps S506, S507, and S601 to S603, in the low electric power generation control, at least one of a delay process of delaying a torque control start timing of the electric generator 20, a torque limiting process of limiting a maximum drive torque of the electric generator 20, and a limiting process of limiting a change rate when changing a drive torque of the electric generator 20 is executed. For example, as shown in FIG. 7, at least one of the delay process that sets the delay period D1, the torque limiting process that sets the upper limit value T1, and the limiting process that sets the rate limit RL1 can be executed.

According to this configuration, by executing each of these processes, it is possible to avoid a large change in the rotation of the engine 10 and an engine stall in the low electric power generation control state.

In the control method for the vehicle 1 according to the present embodiment, as shown in FIGS. 9 and 10, either a first low rotation speed LR1 or a second low rotation speed UR1 having a value larger than that of the first low rotation speed LR1 is set as the reference low rotation speed. In steps S506 and S507, in the low electric power generation control, the rotation speed of the engine 10 is switched between the first low rotation speed LR1 and the second low rotation speed UR1 based on at least one of the required electric power of the vehicle 1 and the vehicle speed of the vehicle 1.

According to this configuration, by switching the rotation speed of the engine 10 according to the traveling request of the driver of the vehicle 1, it is possible to adjust the electric power obtained in the low electric power generation control state, and it is possible to satisfy a higher traveling performance request.

In the control method for the vehicle 1 according to the present embodiment, in steps S506 and S507, when the rotation speed of the engine 10 is switched, a change rate limiting process of limiting a change rate of the rotation speed of the engine 10 between the first low rotation speed LR1 and the second low rotation speed UR1 is executed. For example, as shown in FIGS. 9 and 10, the change rate limiting process that sets the change rates RL2 and RL3 can be executed.

According to this configuration, when the rotation speed of the engine 10 is switched, the change rate of the rotation speed is limited, and thus a rapid rotation speed command can be prevented from being issued, and the overshoot or the undershoot of the engine 10 can be avoided in the low electric power generation control state.

In the control method for the vehicle 1 according to the present embodiment, in steps S504 and S507, in the low electric power generation control, when the short-term chargeable electric power PIN_S (example of chargeable electric power) of the battery 40 corresponding to the temperature of the battery 40 is less than the threshold TH2 (example of a second threshold), a vehicle traveling performance deterioration notification process of notifying the occupant that the traveling performance of the vehicle 1 is deteriorated is executed. As the vehicle traveling performance deterioration notification process, for example, the slow lamp can be turned on or blinked.

According to this configuration, it is possible to notify the driver that the traveling performance of the vehicle 1 is deteriorated due to the transition to the low electric power generation control state.

The control device 100 for the vehicle 1 is a control device for a vehicle that includes the electric generator 20, the engine 10 coupled to the electric generator 20, the drive motor 50 configured to drive the vehicle 1, and the battery 40 electrically connected to the electric generator 20 and the drive motor 50, and in which the electric power generated by the electric generator 20 is configured to be supplied to at least one of the battery 40 and the drive motor 50. The control device 100 includes the vehicle controller 30 (example of a controller) configured to calculate, when the temperature of the battery 40 is equal to or lower than the predetermined temperature, the torque required for electric power generation (example of the drive torque target value) based on the required electric power of the vehicle 1 and the state of the battery 40, control the torque of the electric generator 20 based on the torque required for electric power generation, and control the rotation speed of the engine 10 based on the predetermined reference low rotation speed (for example, the rotation speeds UR1 and LR1), thereby performing the low electric power generation control for causing the electric generator 20 to generate electric power.

According to this configuration, since the low electric power generation control can be performed even at a low temperature when the temperature of the battery 40 is equal to or lower than the predetermined temperature, it is possible to continuously perform the charging for ensuring the electric power required for the drive motor 50, the auxiliary components 60, and the like, and it is possible to reduce the risk of the running out of the electric power.

Each process procedure described in the present embodiment is an example for implementing the present embodiment, and an order of a part of each process procedure may be changed within the scope of implementing the present embodiment, or a part of each process procedure may be omitted or other process procedures may be added.

Each process described in the present embodiment is executed based on a program for causing a computer to execute each process procedure. Therefore, the present embodiment can be understood as an embodiment of a program that implements a function of executing each process and a recording medium that stores the program. For example, the program can be stored in a storage device of the control device by performing an update process for adding a new function to the control device. Accordingly, it is possible to cause the updated control device to execute each process described in the present embodiment.

Although the embodiment of the present invention has been described above, the above embodiment is merely a part of application examples of the present invention, and does not mean that the technical scope of the present invention is limited to the specific configurations of the above embodiment.

The invention claimed is:

1. A control method for a vehicle, the vehicle including an electric generator, an engine coupled to the electric generator, a drive motor configured to drive the vehicle, and a battery electrically connected to the electric generator and the drive motor, electric power generated by the electric generator being configured to be supplied to at least one of the battery and the drive motor, the control method comprising:
   starting warm-up of the battery;
   calculating a drive torque target value based on required electric power of the vehicle and a state of the battery;
   determining whether a condition is met that the warm-up of the battery is not completed and the required electric power of the vehicle is less than a first threshold;
   at a first time, at which the condition is met, controlling a torque of the electric generator to the drive torque target value, and a rotation speed of the engine to a first rotation speed; and
   at a second time, at which the condition is not met, controlling a torque of the engine to the drive torque target value while controlling the generator to apply a rotation speed maintenance torque to the engine to maintain the rotation speed of the engine at a second rotation speed.

2. The control method for the vehicle according to claim 1, wherein
   when the condition is met, the torque of the electric generator and the rotation speed of the engine are controlled based on the electric power generated by the electric generator and chargeable electric power of the battery corresponding to the temperature of the battery.

3. The control method for the vehicle according to claim 1, wherein
   when the condition is met, the torque of the electric generator and the rotation speed of the engine are controlled based on the electric power generated by the electric generator and an upper limit SOC of the battery determined according to the battery temperature.

4. The control method for the vehicle according to claim 1, wherein
   when the condition is met, at least one of a delay process of delaying a torque control start timing of the electric generator, a torque limiting process of limiting a maximum drive torque of the electric generator, and a limiting process of limiting a change rate when changing a drive torque of the electric generator is executed.

5. The control method for the vehicle according to claim 1, wherein
   either a third rotation speed or a fourth rotation speed having a value larger than the third rotation speed is set as the first rotation speed, and
   when the condition is met, the rotation speed of the engine is switched between the third rotation speed and the fourth rotation speed based on at least one of the required electric power of the vehicle and a vehicle speed of the vehicle.

6. The control method for the vehicle according to claim 5, further comprising:
   executing, when the rotation speed of the engine is switched, a change rate limiting process of limiting a change rate of the rotation speed of the engine between the third rotation speed and the fourth rotation speed.

7. The control method for the vehicle according to claim 1, wherein
   when the condition is met and a chargeable electric power of the battery corresponding to the temperature of the battery is less than a second threshold, a vehicle traveling performance deterioration notification process of notifying an occupant that a traveling performance of the vehicle is deteriorated is executed.

8. The control method for the vehicle according to claim 1, wherein
   the required electric power of the vehicle is a total value of electric power required for the drive motor and electric power required for auxiliary components of the vehicle, and when the condition is met, the drive torque target value is calculated in a range of chargeable electric power of the battery that is set based on a first chargeable electric power and a second chargeable electric power configured to charge the battery for a time longer than the first chargeable electric power.

9. A controller for a vehicle that comprises an electric generator, an engine coupled to the electric generator, a drive motor configured to drive the vehicle, and a battery electrically connected to the electric generator and the drive motor, electric power generated by the electric generator being configured to be supplied to at least one of the battery and the drive motor, the controller programmed to:
   start warm-up of the battery,
   calculate a drive torque target value based on required electric power of the vehicle and a state of the battery,
   determine whether a condition is met that the warm-up of the battery is not completed and the required electric power of the vehicle is less than a first threshold,
   when the condition is met, control a torque of the electric generator to the drive torque target value, and a rotation speed of the engine to a first rotation speed; and when the condition is not met, control a torque of the
engine to the drive torque target value while controlling
the generator to apply a rotation speed maintenance
torque to the engine to maintain the rotation speed of
the engine at a second rotation speed.

* * * * *